United States Patent
Lee et al.

(10) Patent No.: US 9,005,813 B2
(45) Date of Patent: Apr. 14, 2015

(54) NEGATIVE ELECTRODE ACTIVE MATERIAL, METHOD FOR PREPARING THE SAME AND LITHIUM SECONDARY BATTERY INCLUDING NEGATIVE ELECTRODE ACTIVE MATERIAL

(75) Inventors: Jong-Hee Lee, Yongin-si (KR); Yong-Mi Yu, Yongin-si (KR); Joa-Young Jeong, Yongin-si (KR); Jae-Myung Kim, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 86 days.

(21) Appl. No.: 13/365,184

(22) Filed: Feb. 2, 2012

(65) Prior Publication Data
US 2012/0258368 A1    Oct. 11, 2012

Related U.S. Application Data

(60) Provisional application No. 61/472,058, filed on Apr. 5, 2011.

(51) Int. Cl.
| | |
|---|---|
| *H01M 4/58* | (2010.01) |
| *H01M 4/13* | (2010.01) |
| *H01M 4/485* | (2010.01) |
| *C01G 23/00* | (2006.01) |

(52) U.S. Cl.
CPC ............ *H01M 4/485* (2013.01); *C01G 23/003* (2013.01); *C01P 2002/72* (2013.01); *C01P 2002/74* (2013.01); *Y02E 60/122* (2013.01)

(58) Field of Classification Search
USPC .......................................... 429/231.1, 231.6
See application file for complete search history.

(56) References Cited

U.S. PATENT DOCUMENTS

| | | | |
|---|---|---|---|
| 6,423,448 | B1 | 7/2002 | Sato et al. |
| 6,730,435 | B1 | 5/2004 | Nakane et al. |
| 7,390,594 | B2 | 6/2008 | Belharouak et al. |
| 2012/0045693 | A1* | 2/2012 | Eom .............................. 429/220 |

FOREIGN PATENT DOCUMENTS

| | | |
|---|---|---|
| EP | 2 420 475 A1 | 2/2012 |
| JP | 11-40159 A | 2/1999 |

(Continued)

OTHER PUBLICATIONS

C. H. Chen, J.T. Vaughey, A.N. Jansen, D.W. Dees, A.J. Kahaian, T. Goucher, and M.M. Thackeray, Studies of Mg-Substituted $Li_{4-x}Mg_xTi_5O_{12}$ Spinel Electrodes ($0 \le x \le$) for Lithium Batteries, Journal, 2001, pp. A102-A104, vol. 148 (1), Journal of the Electrochemical Society.

(Continued)

*Primary Examiner* — Muhammad Siddiquee
(74) *Attorney, Agent, or Firm* — Knobbe Martens Olson & Bear LLP

(57) ABSTRACT

A negative electrode active material, a method of preparing the negative electrode active material and a lithium secondary battery including the negative electrode active material are disclosed. A negative electrode active material includes a lithium titanate, wherein a portion of lithium of the lithium titanate is substituted by at least one selected from the group consisting of Sr, Ba, a mixture thereof and an alloy thereof, and thus a lithium secondary battery including the negative electrode active material may improve high-rate discharge characteristics.

10 Claims, 3 Drawing Sheets

(56) References Cited

FOREIGN PATENT DOCUMENTS

| | | |
|---|---|---|
| JP | 2001-126728 | 5/2001 |
| KR | 2001-0040161 A | 5/2001 |
| KR | 1020080023831 A | 3/2008 |
| WO | WO 2012/002365 A1 | 5/2012 |

OTHER PUBLICATIONS

Shuangze Ji, Junying Zhang, Wenwen Wang, Yan Huang, Zerong Feng, Zhongtai Zhang, Zilong Tang, Preparation and effects of Mg-doping on the electrochemical properties of spinel $Li_4Ti_5O_{12}$ as anode material for lithium one battery, Journal, 2010, pp. 510-515, vol. 123, Materials Chemistry and Physics;.www.elsevier.com/locate/matchemphys.

Byung-Hyun Choi, Dae-Jin Lee, Mi-Jung Ji, Young-Jin Kwon, and Sung-Tae Park, Study of the Electrochemical Properties of the $Li_4Ti_5O_{12}$ Doped with Ba and Sr Anodes for Lithium-Ion Secondary Batteries, Journal, 2010, pp. 638-642, vol. 47, No. 6, Journal of the Korean Ceramic Society.

Extended European Search Report issued by the European Patent Office dated Jul. 11, 2012, 8 pages.

* cited by examiner

NEGATIVE ELECTRODE ACTIVE MATERIAL, METHOD FOR PREPARING THE SAME AND LITHIUM SECONDARY BATTERY INCLUDING NEGATIVE ELECTRODE ACTIVE MATERIAL

BACKGROUND

1. Field

One or more embodiments relate to negative electrode active material, methods of preparing the same, and a lithium secondary battery including the negative electrode active material.

2. Description of the Related Technology

The recent technology development of and increasing demand for mobile devices have led to high demand for secondary batteries as an energy source. Among secondary batteries, lithium secondary batteries having high energy density and high voltage are commercially available and widely used.

In general, a lithium secondary battery is prepared by forming a positive electrode and a negative electrode of a material that intercalate or deintercalate lithium ions and filling an organic electrolyte solution or a polymer electrolyte solution between the positive electrode and the negative electrode.

The lithium secondary battery generates electrical energy by oxidation reaction and reduction reaction that occur when lithium ions are intercalated and deintercalated.

As an anode active material of a lithium secondary battery, graphite, a high-capacity silicon-based transition metal oxide, a tin-based transition metal oxide or the like is used.

From these materials, recently, $Li_4Ti_5O_{12}$ material has attracted considerable attention as a negative active material of a lithium secondary battery. Since $Li_4Ti_5O_{12}$ material is not structurally changed although the lithium secondary battery is repeatedly charged and discharged, and reversible intercalation and deintercalation of Li ions are smoothly occur, $Li_4Ti_5O_{12}$ material is one of negative electrode active materials that are very useful to develop large-sized energy storage devices.

SUMMARY

One or more embodiments include negative electrode active materials having improved high-rate discharge characteristics.

One or more embodiments include methods of preparing the negative electrode active materials.

One or more embodiments include lithium secondary batteries including the negative electrode active materials and having improved high-rate discharge characteristics.

According to one or more embodiments, a negative electrode active material includes a lithium titanate, wherein a portion of lithium of the lithium titanate is substituted by at least one selected from the group consisting of strontium (Sr), barium (Ba), a mixture thereof and an alloy thereof.

According to one or more embodiments, a method of preparing a negative electrode active material includes forming a mixture by mixing a lithium salt, a titanium (Ti) precursor and an alkaline earth metal salt; and heat-treating the mixture.

According to one or more embodiments, a lithium secondary battery includes a positive electrode; a negative electrode including the negative electrode active material; and an electrolyte solution interposed between the positive electrode and the negative electrode.

As described above, according to the one or more of the above embodiments, a negative electrode active material includes a lithium titanate, wherein a portion of lithium of the lithium titanate is substituted by at least one selected from the group consisting of strontium (Sr), barium (Ba), a mixture thereof and an alloy thereof, and thus may improve electrical conductivity and the high-rate discharge characteristics of a lithium secondary battery including the negative electrode active material.

DETAILED DESCRIPTION

Figure 1:
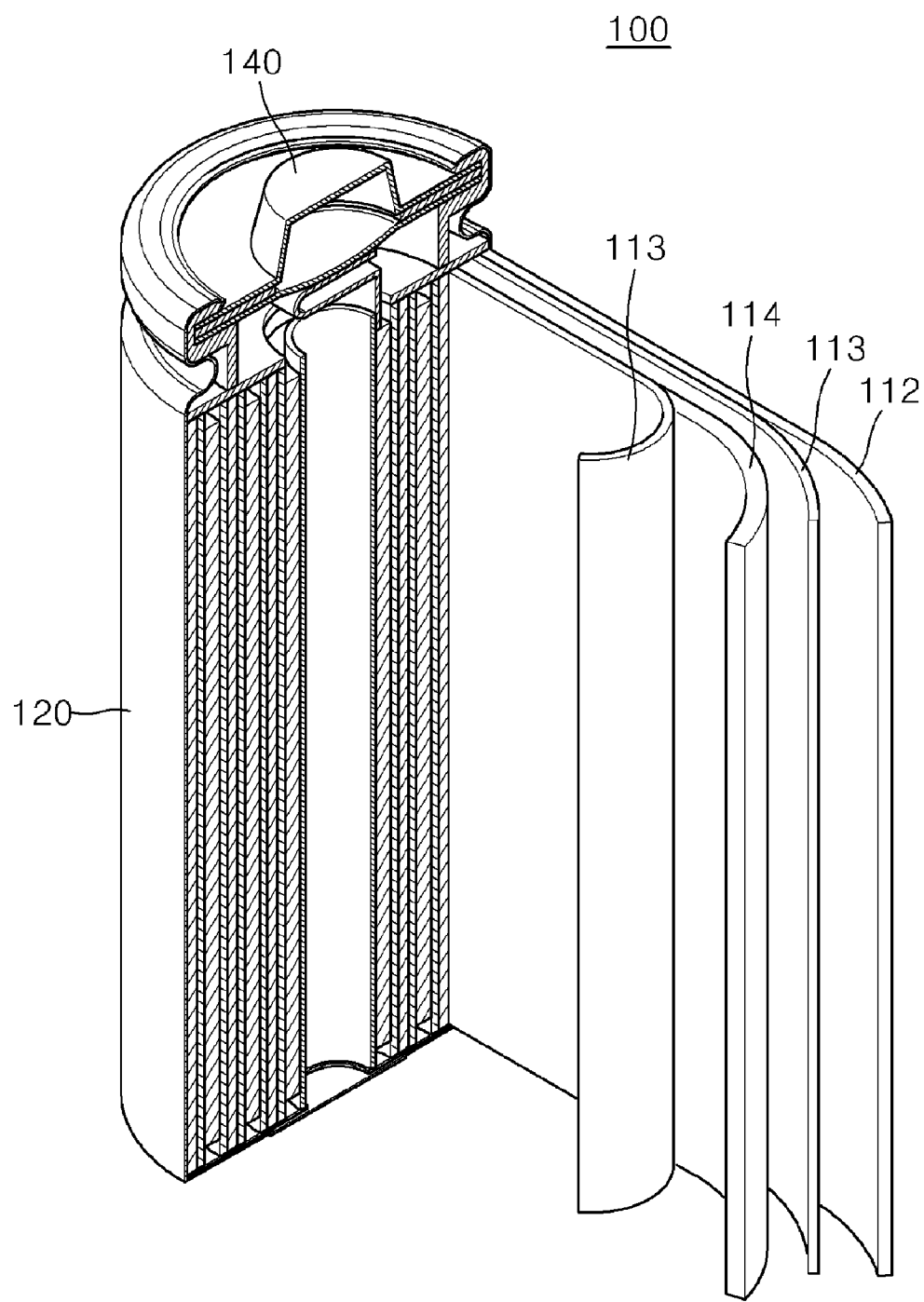
FIG. 1 is an exploded perspective view of a lithium secondary battery according to an embodiment.

Hereinafter, a negative electrode active material, a method of preparing the negative electrode active material and a lithium secondary battery including the negative electrode active material will be described in detail. However, these are just examples, and thus the embodiments are not limited thereto and spirit of the embodiments, the scope of which is defined in the claims and their equivalents According to an embodiment, a negative electrode active material may include a lithium titanate, wherein a portion of lithium of the lithium titanate may be substituted by at least one selected from the group consisting of strontium (Sr), barium (Ba), a mixture thereof and an alloy thereof.

Some lithium sites of the negative electrode active material are substituted by Sr, Ba, a mixture thereof and an alloy thereof, which have thermal conductivity of about 1/10 of other metal atoms, and thus a lithium secondary battery including the negative electrode active material may have a lower explosion danger and improved electrical conductivity to thus have improved high-rate discharge characteristics.

The lithium titanate may be represented by Formula 1 below.

$$Li_{4-x}M_xTi_5O_{12},\qquad\text{Formula 1}$$

where 0<x<0.6 and M may be at least one selected from the group consisting of Sr, Ba, a mixture thereof and an alloy thereof.

In Formula 1, x may be 0<x<0.6, for example, 0<x<0.5, and in another example, 0<x<0.12.

The negative electrode active material can be a lithium titanate having a stable structure with a spinel shape. If a lithium titanate is used as a negative electrode active material, flatness of a potential curve, excellent charge/discharge cycles and power characteristics as well as durability may be obtained.

In addition, even if the lithium titanate includes a small amount of M, like the above-mentioned range of x, a lithium secondary battery including lithium titanate may have improved high-rate discharge characteristics.

The lithium titanate may have about 0.07° to about 0.09° of a half band width of a peak of a surface (111) in an X-ray diffraction pattern obtained by using an X-ray with CuK-alpha characteristics.

The X-ray diffraction pattern may be obtained by X-ray diffraction analysis using an X-ray having a wavelength of 1.541 Å with CuK-alpha characteristics.

A peak of the surface (111) of the lithium titanate may be shown in a region with a Bragg angle 2θ of 18.7±0.2°, for example, a region with about 18.7°.

However, a peak of a surface (111) of the lithium titanate, in which a portion of ithium of the lithium titanate is not substituted, may be shown in a region with a Bragg angle 2θ of 18.3±0.2°, for example, a region with about 18.3°.

Thus, when a negative electrode active material includes a lithium titanate, wherein a portion of lithium of the lithium titanate is substituted by at least one selected from the group consisting of Sr, Ba, a mixture thereof and an alloy thereof, the lithium titanate has a peak of a Bragg angle 2θ that is transited to an angle higher by from about 0.2° to about 0.6° than a peak of a Bragg angle 2θ of a lithium titanate in which some lithium sites are not substituted.

The lithium titanate may have about 0.11° to about 0.13° of a half band width of a peak of a surface (311) in an X-ray diffraction pattern obtained by using an X-ray with CuK-alpha characteristics.

A peak of the surface (311) of the lithium titanate may be observed in a region with a Bragg angle 2θ of 35.9±0.2°, for example, a region with about 35.9°.

However, a peak of a surface (311) of the lithium titanate, in which a portion of lithium of the lithium titanate is not substituted, may be observed in a region with a Bragg angle 2θ of 35.5±0.2°, for example, a region with about 35.5°.

Thus, when a negative electrode active material includes a lithium titanate, wherein a portion of lithium of the lithium titanate is substituted by at least one selected from the group consisting of Sr, Ba, a mixture thereof and an alloy thereof, the lithium titanate has a peak of a Bragg angle 2θ that is transited to an angle higher by from about 0.2° to about 0.6° than a peak of a Bragg 2θ of a lithium titanate in which some lithium sites are not substituted.

The lithium titanate may have about 0.35 to about 0.60, for example, about 0.40 to about 0.55, of an intensity ratio (I(310)/I(111)) of a peak of the surface (311) with respect to the surface (111) in an X-ray diffraction pattern obtained by using an X-ray with CuK-alpha characteristics.

According to another embodiment, a method of preparing a negative electrode active material may include forming a mixture by mixing a lithium salt, a Ti precursor and an alkaline earth metal salt; and heat-treating the mixture.

The mixture may be formed by simultaneously mixing and mechanically mixing a lithium salt, a Ti precursor and an alkaline earth metal salt.

The mechanical mixing may be performed by using, for example, a ball mill, a banbary mixer, homogenizer, or the like.

A mixing rate of the lithium salt, the Ti precursor and the alkaline earth metal salt is appropriately controlled so that a portion of lithium of the lithium titanate may be substituted by at least one selected from the group consisting of strontium (Sr), barium (Ba), a mixture thereof and an alloy thereof.

The lithium titanate may be a lithium oxide represented by Formula 1 above.

For example, the amount of the alkaline earth metal salt may be about 0.003 mol to about 0.17, for example, about 0.003 mol to about 0.14, and for example, about 0.003 mol to about 0.03, based on 1 mol of a lithium salt.

The lithium salt may include, for example, at least one selected from the group consisting of lithium carbonate, lithium hydroxide, lithium fluoride, lithium sulfate, lithium nitrate, lithium chloride and lithium oxide, but is not limited thereto, and may be any lithium salt that is commonly used in the art.

The Ti precursor may include titanium oxide, titanium hydroxide, titanium chloride or a combination thereof, but is not limited thereto, and may be any Ti precursor that is commonly used in the art.

The titanium oxide may be, for example, titanate oxide referred to as titanium dioxide or titanic acid anhydride titania, titanium oxide(II), titanium oxide(III) or titanium peroxide. The titanium oxide(IV) may be of, for example, a brookite type of an orthorhombic crystal system, or an anatase type or a rutile type of a tetragonal crystal system, according to its crystalline structure.

The alkaline earth metal salt may include, for example, at least one selected from the group consisting of strontium carbonate, strontium hydroxide, strontium nitrate, strontium sulfate, strontium chloride, strontium oxide, barium carbonate, barium hydroxide, barium nitrate, barium sulfate, barium chloride and barium oxide, but is not limited thereto, and may be any alkaline earth metal salt of Sr, Ba, a mixture thereof and an alloy thereof, which is commonly used in the art.

The method may include heat-treating the mixture. In this case, a temperature for the heat-treating may be about 700 to about 1000° C., for example, about 700 to about 900° C. The heat-treating may be performed for from about 30 minutes to about 10 hours, for example, about 30 minutes to about 5 hours.

The alkaline earth metal salt may be melted at a temperature within the above range for a period of time within the above range and then may be contained in some lithium sites of the lithium titanate without affecting a structure of a lithium titanate.

The method may include pulverizing after the heat-treating is performed.

The method is not limited to a particular method such as a solid phase method, a liquid phase method, a vapor phase method and the like, and may be any method of preparing the negative electrode active material.

According to another embodiment, a lithium secondary battery may include a positive electrode; a negative electrode including the negative electrode active material; and an electrolyte solution interposed between the positive electrode and the negative electrode.

FIG. 1 is an exploded perspective view of a lithium secondary battery 100 according to an embodiment. In FIG. 1, the lithium secondary battery is a cylindrical battery, but is not limited thereto, and the lithium secondary battery may have a rectangular type or a pouch type.

Lithium secondary batteries may be classified as a lithium ion battery, a lithium ion polymer battery, and a lithium polymer battery, according to a separator and an electrolyte; may be classified as a cylinder-type battery, a rectangular-type battery, a coin-type battery, a pouch-type battery, according to the shape of a battery; and may be classified as a bulk-type battery and a thin-film-type battery, according to the size of a battery. The shape of the lithium secondary battery according to the present embodiment is not particularly limited.

With reference to FIG. 1, the lithium secondary battery 100 is a cylinder-type battery and includes a negative electrode 112, a positive electrode 114, a separator 113 interposed between the negative electrode 112 and the positive electrode 114, an electrolyte (not shown) impregnated to the negative electrode 112, the positive electrode 114 and the separator 113, a battery container 120, and a sealing member 140 for sealing the battery container 120. The lithium secondary battery 100 is configured by sequentially stacking the negative electrode 112, the positive electrode 114 and the separator 113, winding the negative electrode 112, the positive electrode 114 and the separator 113 in a spiral type and then accommodating the negative electrode 112, the positive electrode 114 and the separator 113 in the battery container 120.

The negative electrode 112 includes a current collector and a negative electrode active material layer formed on the current collector, and the negative electrode active material layer includes a negative electrode active material.

The current collector used in the negative electrode 112, and may comprise copper (Cu), nickel (Ni), aluminum (Al) or stainless Us steel (SUS) according to a voltage region. For example, the current collector may comprise Al.

The negative electrode active material may include a lithium titanate, wherein a portion of lithium of the lithium titanate may be substituted by at least one selected from the group consisting of Sr, Ba, a mixture thereof and an alloy thereof.

A lithium secondary battery including a negative electrode including the negative electrode active material may use at least one selected from the group consisting of Sr, Ba, a mixture thereof and an alloy thereof, which have high electrical conductivity, to thus have improved cell performance in high-rate and improved stability due to low thermal conductivity.

The negative electrode active material layer may include a binder, and selectively may further include a conductive agent.

The binder may allow negative active material particles to be attached to each other and the negative active material to be attached to the current collector. Nonlimiting examples of the binder include polyvinylalcohol, carboxymethylcellulose, hydroxypropylcellulo se, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and a mixture thereof.

The conductive agent may provide conductivity to the negative electrode and may be any one of various materials that do not cause any chemical change in a battery to be formed and conduct electrons. The conductive agent may include at least one selected from the group consisting of natural graphite, artificial graphite, carbon black, acetylene black, ketjen black, carbon fiber, copper powder or fiber, nickel powder or fiber, aluminum powder or fiber, silver powder or fiber, and a polyphenylene derivative. The current collector may comprise Cu foil, Ni foil, stainless steel foil, Ti foil, Ni foam, Cu foam, a polymer material doped with a conductive metal, or a combination thereof.

In this regard, amounts of the negative active material, the conductive agent, and the binder may be at the equivalent levels as used in a conventional lithium battery. For example, a mixed weight ratio of the negative active material to the mixture of the conductive agent and the binder may be about 98:2 to about 92:8, and is not limited thereto, and a mixed weight ratio of the conductive agent and the binder may be about 1:1.0 to 3, and is not limited thereto.

The positive electrode 114 may include a current collector and a positive active material layer formed on the current collector.

The current collector may include aluminum (Al), but is not limited thereto.

The positive active material may be any positive material that is generally used in the art, but is not limited thereto, and more particularly, may include a compound that reversibly intercalate or deintercalate lithium. In detail, the positive active material may include at least one complex oxide of lithium and at least one selected from the group consisting of cobalt (Co), manganese (Mn), nickel (Ni) and a mixture thereof. For examples, the positive active material may be a compound represented by any one of the following formulae: $Li_aA_{1-b}B_bD_2$ where $0.90 \leq a \leq 1.8$ and $0 \leq b \leq 0.5$; $Li_aE_{1-b}B_bO_{2-c}D_c$ where $0.90 \leq a \leq 1.8$, $0 \leq b \leq 0.5$ and $0 \leq c \leq 0.05$; $LiE_{2-b}B_bO_{4-c}D_c$ where $0 \leq b \leq 0.5$ and $0 \leq c \leq 0.05$; $Li_aNi_{1-b-c}Co_bB_cD_\alpha$ where $0.90 \leq a \leq 1.8$, $0 \leq b \leq 0.5$, $0 \leq c \leq 0.05$ and $0 < \alpha \leq 2$; $Li_aNi_{1-b-c}Co_bB_cO_{2-\alpha}F_\alpha$ where $0.90 \leq a \leq 1.8$, $0 \leq b \leq 0.5$, $0 \leq c \leq 0.05$ and $0 < \alpha < 2$; $Li_aNi_{1-b-c}Co_bB_cO_{2-\alpha}F_2$ where $0.90 \leq a \leq 1.8$, $0 \leq b \leq 0.5$, $0 \leq c \leq 0.05$ and $0 < \alpha < 2$; $Li_aNi_{1-b-c}Mn_bB_cD_\alpha$ where $0.90 \leq a \leq 1.8$, $0 \leq b \leq 0.5$, $0 \leq c \leq 0.05$ and $0 < \alpha \leq 2$; $Li_aNi_{1-b-c}Mn_bB_cO_{2-\alpha}F_\alpha$ where $0.90 \leq a \leq 1.8$, $0 \leq b \leq 0.5$, $0 \leq c \leq 0.05$ and $0 < \alpha < 2$; $Li_aNi_{1-b-c}Mn_bB_cO_{2-\alpha}F_2$ where $0.90 \leq a \leq 1.8$, $0 \leq b \leq 0.5$, $0 \leq c \leq 0.05$ and $0 < \alpha < 2$; $Li_aNi_bE_cG_dO_2$ where $0.90 \leq a \leq 1.8$, $0 \leq b \leq 0.9$, $0 \leq c \leq 0.5$ and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$ and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

For example, the positive active material may be $LiMn_2O_4$, $LiNi_2O_4$, $LiCoO_2$, $LiNiO_2$, $LiMnO_2$, $Li_2MnO_3$, $LiFePO_4$ or $LiNi_xCo_yO_2$ ($0 < x \leq 0.15$ and $0 < y \leq 0.85$) and the like.

In the formulae as described above, A is selected from the group consisting of Ni, Co, Mn, and a combination thereof; B is selected from the group consisting of Al, Ni, Co, Mn, Cr, Fe, Mg, Sr, V, a rare-earth element, and a combination thereof; D is selected from the group consisting of O, F, S, P, and a combination thereof; E is selected from Co, Mn and a combination thereof; F is selected from F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; I is selected from the group consisting of Cr, V, Fe, Sc, Y, and a combination thereof; and J is selected from the group consisting of V, Cr, Mn, Co, Ni, Cu, and a combination thereof.

A coating layer may be formed on the compound, and the compound and a compound including the coating layer may be mixed and used. The coating layer may include a compound of a coating element, such as an oxide of the coating element, a hydroxide of the coating element, an oxyhydroxide of the coating element, an oxycarbonate of the coating element or a hydroxycarbonate of the coating element. A compound constituting the coating layer may be amorphous or crystalline. The coating element including the coating layer may include Mg, Al, Co, K, Na, Ca, Si, Ti, V, Sn, Ge, Ga, B, As, Zr or a mixture thereof. A method of forming the coating layer may be any method (e.g., a spray coating, an immersion method or the like) as long as the physical properties of a positive electrode active material are not badly affected if the elements are used in the compound.

The positive electrode active material layer may include a binder and a conductive agent.

The binder may allow positive active material particles to be attached to each other and the positive active material to be attached to the current collector. Nonlimiting examples of the binder include polyvinylalcohol, carboxymethylcellulose, hydroxypropylcellulo se, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and a mixture thereof.

The conductive agent may provide conductivity to the positive electrode and may be any one of various materials that do not cause any chemical change in a battery to be formed and conduct electrons. The conductive agent may include at least one selected from the group consisting of natural graphite, artificial graphite, carbon black, acetylene black, ketjen black, carbon fiber, copper powder or fiber, nickel powder or fiber, aluminum powder or fiber, silver powder or fiber, and a polyphenylene derivative.

In this case, amounts of the positive active material, the binder, and the conductive agent may be at the equivalent levels as used in a conventional lithium battery. For example, a weight ratio of the positive active material to the mixture of the conductive agent and the binder may be about 98:2 to about 92:8, and is not limited thereto, and a mixed weight ratio of the conductive agent to the binder may be about 1:1.0 to about 3, and is not limited thereto.

The negative electrode 112 and the positive electrode 114 are each prepared by mixing an active material, a binder and a conductive agent in a solvent to prepare an active material composition and coating the active material composition on a current collector. The solvent may be N-methylpyrrolidone or the like, but is not limited thereto.

According to the type of a lithium battery, a separator may be further interposed between the positive electrode and the negative electrode. The separator may be a single or multi-layer of polyethylene, polypropylene, or polyvinyllidene fluoride. Also, the separator may instead be a mixed multi-layer, such as a two-layer separator including polyethylene and polypropylene, a three-layer separator including polyethylene, polypropylene, and polyethylene, or a three-layer separator including polypropylene, polyethylene, polypropylene.

One or more embodiments will now be described in further detail with reference to the following examples. These examples are for illustrative purpose only and are not intended to limit the scope of the one or more embodiments.

In addition, technologies that are not described herein are obvious in the art and thus, will not be described herein.

Preparation of Negative Active Material

Example 1

159.3 part by weight of lithium carbonate, 406.4 part by weight of titanium oxide(IV) and 6.5 part by weight of barium carbonate were mixed in a powder mixer for 10 minutes to prepare a mixture. A temperature increased to 850° C. by 5° C. every minutes under an oxygen atmosphere, and the mixture was heat-treated for 5 hours at 850° C. to prepare the resultant. The resultant was pulverized by a powder crusher to prepare a negative electrode active material of $Li_{3.92}Ba_{0.08}Ti_5O_{12}$.

Example 2

A negative electrode active material of $Li_{3.92}Sr_{0.08}Ti_5O_{12}$ was prepared in the same manner as in Example 1 except that 7.0 part by weight of strontium carbonate instead of 6.5 part by weight of barium carbonate was mixed in a powder mixer for 10 minutes to prepare a mixture.

Comparative Example 1

A negative electrode active material of $Li_4Ti_5O_{12}$ was prepared in the same manner as in Example 1 except that barium carbonate was not added.

Preparation of Lithium Secondary Battery

Example 3

The negative electrode active material of $Li_{3.92}Ba_{0.08}Ti_5O_{12}$ prepared in Example 1 was mixed with polyvinylidenfluoride (PVdF) and denka black in a mixed ratio of 89:6:5, in NMP solvent to prepare a slurry.

The slurry was coated on an Al foil to a thickness of 68 μm, was pressed and then was dried in a vacuum for 12 hours at 130° C. to prepare a negative electrode.

Then, the negative electrode was wound to have a circular shape with a diameter of 14ø. A coin cell of CR-2032 was prepared by forming an opposite electrode of a lithium metal, forming a separator of polypropylene and using a solution in which 1.0 M of $LiPF_6$ was dissolved in ethylene carbonate (EC) and ethyl methyl carbonate (EMC), which were mixed in a volume ratio of 3:7, as an electrolyte solution.

Example 4

A coin cell of CR-2032 was prepared in the same manner as in Example 3 except that the negative electrode active material of $Li_{3.92}Sr_{0.08}Ti_5O_{12}$ prepared in Example 2 instead of the negative electrode active material of $Li_{3.92}Ba_{0.08}Ti_5O_{12}$ prepared in Example 1 was used.

Comparative Example 2

A coin cell of CR-2032 was prepared in the same manner as in Example 3 except that the negative electrode active material of $Li_4Ti_5O_{12}$ prepared in Comparative Example 1 was used.

X-Ray Diffraction Analysis of Negative Electrode Active Material

Analysis Example 1

X-Ray Diffraction Analysis

X-ray diffraction analysis (XRD, X' pert Pro available from Philips) was performed on $Li_{3.92}Ba_{0.08}Ti_5O_{12}$ prepared in Example 1. The result was shown in FIG. 2.

Figure 2:
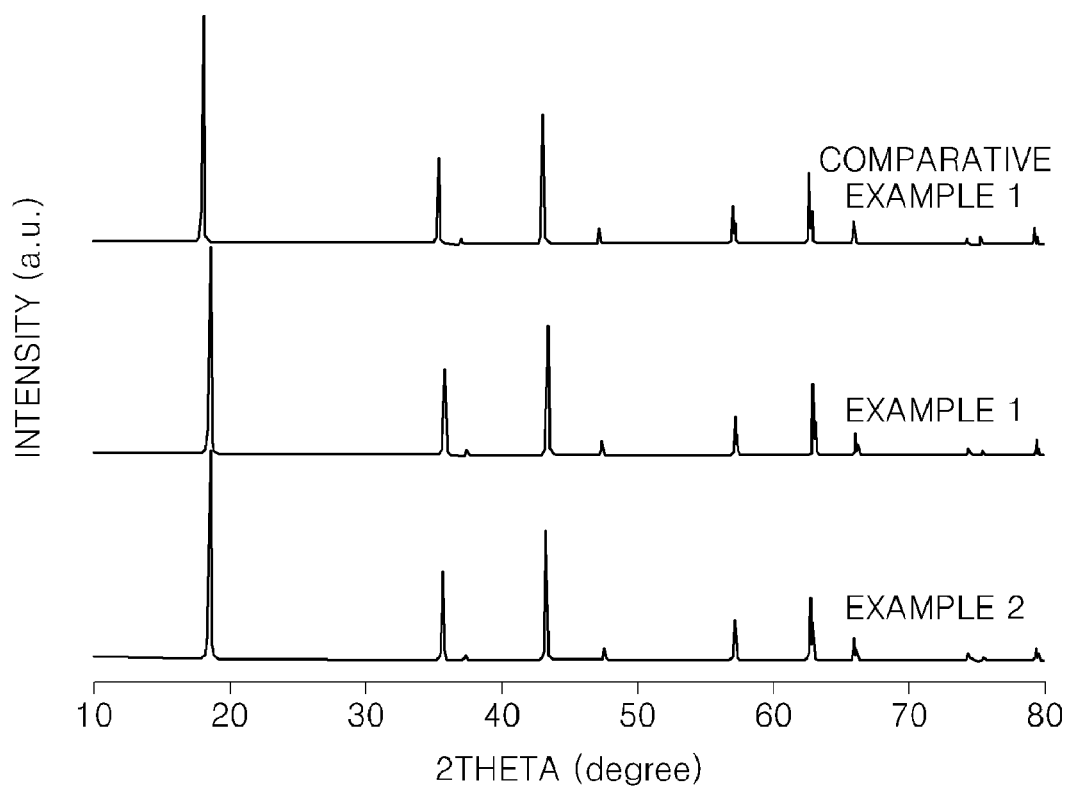
FIG. 2 is a graph showing a result of X-ray diffraction analysis of negative electrode active materials prepared in Examples 1, 2, and Comparative Example 1.

Referring to FIG. 2, as a result of the X-ray diffraction analysis of $Li_{3.92}Ba_{0.08}Ti_5O_{12}$ prepared in Example 1, peaks of Bragg angle 2θ were observed in about 18.7°, about 35.9°, about 43.6°, about 47.7°, about 57.6°, about 63.1°, about 66.3°, about 74.6°, about 75.6° and about 79.7°.

As a result of the X-ray diffraction analysis of $Li_{3.92}Sr_{0.08}Ti_5O_{12}$ prepared in Example 2, peaks of Bragg angle 2θ were observed in about 18.5°, about 35.7°, about 43.4°, about 47.5°, about 57.4°, about 62.9°, about 66.1°, about 74.4°, about 75.4° and about 79.5°.

As a result of the X-ray diffraction analysis of $Li_4Ti_5O_{12}$ prepared in Comparative Example 1, peaks of Bragg angle 2θ were observed in about 18.3°, about 35.5°, about 43.2°, about 47.3°, about 57.2°, about 62.7°, about 65.9°, about 74.2°, about 75.2° and about 79.3°.

That is, peaks of Bragg angle 2θ obtained by the X-ray diffraction analyses of $Li_{3.92}Ba_{0.08}Ti_5O_{12}$ prepared in Example 1 and $Li_{3.92}Sr_{0.08}Ti_5O_{12}$ prepared in Example 2 are transited to peaks respectively higher by about 0.4° and about 0.2° than peaks of Bragg angle 2θ obtained by the X-ray diffraction analysis of $Li_4Ti_5O_{12}$ prepared in Comparative Example 1.

In addition, as a result of the X-ray diffraction analysis of $Li_{3.92}Ba_{0.08}Ti_5O_{12}$ prepared in Example 1, a peak of a surface (111) was observed in a region of about 18.7° a and a peak of a surface (311) was observed in a region of about 35.9°, from among peaks of the Bragg angle 2θ.

A half band width of a peak of the surface (111) was about 0.07° to about 0.09° and a half band width of a peak of the surface of (311) was about 0.11° to about 0.13°.

Evaluation of Characteristics of Lithium Secondary Battery

Evaluation Example 1

Evaluation of High-Rate Discharge Characteristics

The coin cells of CR-2032 prepared in Examples 3, 4, and Comparative Example 2 were charged with a static current (0.2 C) and a static voltage (0.9V, 0.01 C cut-off), were rest in 10 minutes and then discharged with a static current (0.2 C, 0.5 C, 1 C, 2 C, 5 C or 10 C) until a voltage reached 3.0 V. That is, a charge capacity and a discharge capacity were evaluated by changing respectively charge/discharge speeds of 0.2 C, 0.5 C, 1 C, 2 C, 5 C or 10 C.

Figure 3:
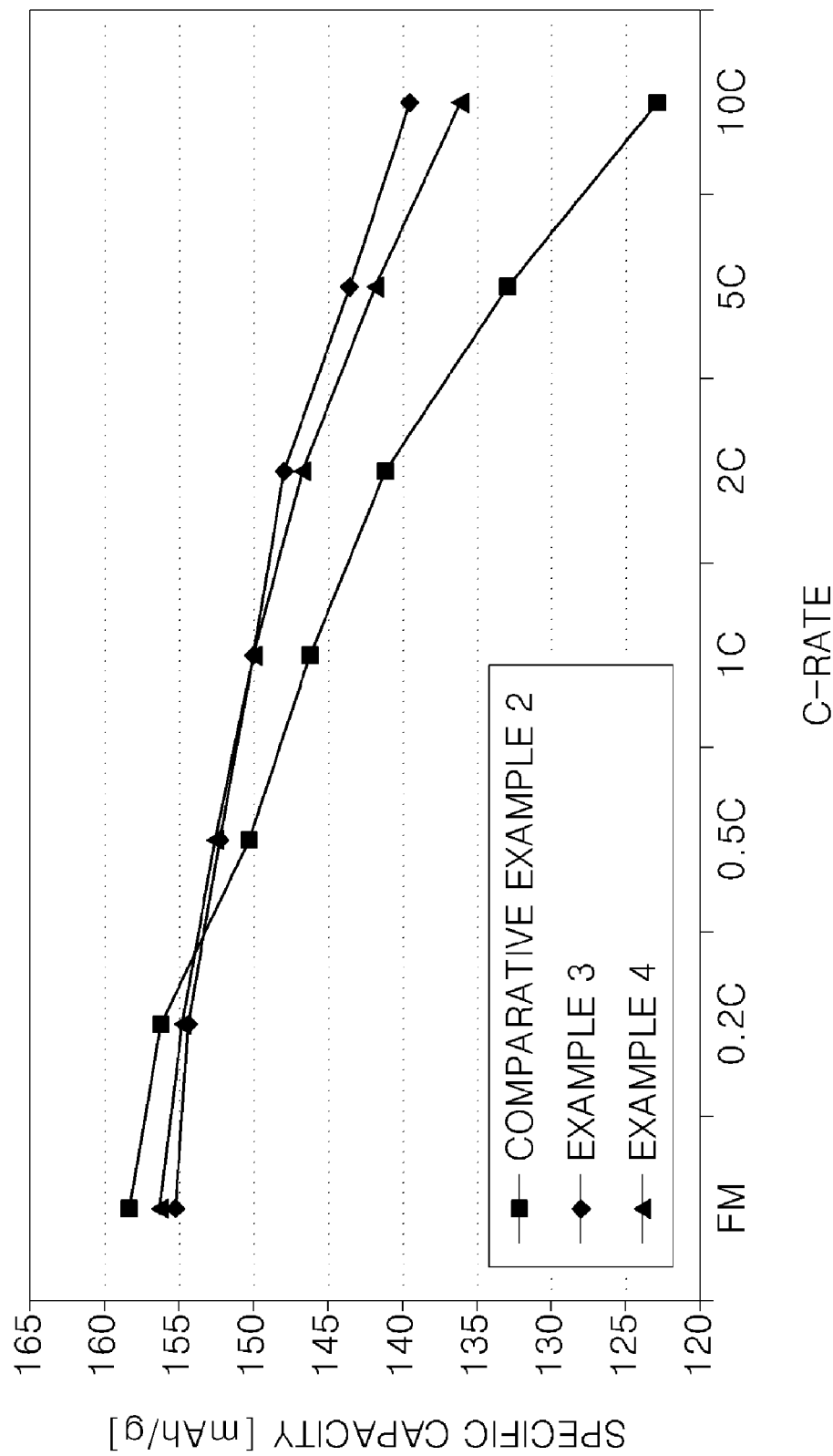
FIG. 3 is a graph showing capacity retention rates of lithium secondary batteries, which are prepared in Examples 3, 4, and Comparative Example 2, respectively.

The result was shown in FIG. 3 and Tables 1 and 2.

In FIG. 3, the 'C-rate' refers to a discharge speed of a cell and is a value obtained by dividing a total capacity of the cell by a total discharge time. Table 1 shows evaluation of the characteristics of the lithium secondary battery of Example 3. Table 2 shows evaluation of the characteristics of the lithium secondary battery of Example 4. Table 3 shows evaluation of the characteristics of the lithium secondary battery of Comparative Example 2.

TABLE 1

|  | Charge Capacity (mAh/g) | Discharge Capacity (mAh/g) | Capacity Retention Rate (%) | Charge/discharge Efficiency (%) |
| --- | --- | --- | --- | --- |
| FM | 163.40 | 155.20 | 100.00 | 94.98 |
| 0.2C | 157.49 | 154.40 | 99.48 | 98.03 |
| 0.5C | 156.14 | 152.24 | 98.10 | 97.51 |
| 1C | 155.32 | 150.03 | 96.67 | 96.59 |
| 2C | 154.62 | 147.74 | 95.19 | 95.55 |
| 5C | 154.25 | 143.54 | 92.49 | 93.05 |
| 10C | 154.05 | 139.62 | 89.96 | 90.63 |

TABLE 2

|  | Charge Capacity (mAh/g) | Discharge Capacity (mAh/g) | Capacity Retention Rate (%) | Charge/discharge Efficiency (%) |
| --- | --- | --- | --- | --- |
| FM | 164.30 | 156.31 | 100.00 | 95.14 |
| 0.2C | 157.91 | 154.76 | 99.01 | 98.01 |
| 0.5C | 156.30 | 152.53 | 97.58 | 97.59 |
| 1C | 155.52 | 149.97 | 95.94 | 96.43 |
| 2C | 154.25 | 146.77 | 93.90 | 95.15 |
| 5C | 153.83 | 141.88 | 90.77 | 92.23 |
| 10C | 152.87 | 136.13 | 87.09 | 89.05 |

TABLE 3

|  | Charge Capacity (mAh/g) | Discharge Capacity (mAh/g) | Capacity Retention Rate (%) | Charge/discharge Efficiency (%) |
| --- | --- | --- | --- | --- |
| FM | 170.04 | 158.39 | 100.00 | 93.15 |
| 0.2C | 159.67 | 156.21 | 98.62 | 97.83 |
| 0.5C | 157.43 | 150.36 | 94.93 | 95.51 |

TABLE 3-continued

|  | Charge Capacity (mAh/g) | Discharge Capacity (mAh/g) | Capacity Retention Rate (%) | Charge/discharge Efficiency (%) |
| --- | --- | --- | --- | --- |
| 1C | 155.69 | 146.12 | 92.25 | 93.85 |
| 2C | 154.76 | 141.15 | 89.12 | 91.21 |
| 5C | 154.17 | 132.83 | 83.86 | 86.16 |
| 10C | 153.88 | 122.92 | 77.61 | 79.88 |

Referring to FIG. 3 and Tables 1 to 3, the lithium secondary battery of Example 3 has respectively a capacity retention rate of 92.49% and charge/discharge efficiency of 93.05%, and the lithium secondary battery of Example 4 has respectively a capacity retention rate of 90.77% and charge/discharge efficiency of 92.23% in 0.2 C to 5 C, and exhibits cell performance higher by about 8% and about 6% than the Comparative Example 2.

In addition, the lithium secondary battery of Example 3 has a capacity retention rate of 89.96% and charge/discharge efficiency of 90.63%, and the lithium secondary battery of Example 4 has a capacity retention rate of 87.09% and charge/discharge efficiency of 89.05% in 0.2 C to 10 C and exhibits cell performance higher by about 10% and about 9% than the Comparative Example 2.

High-rate discharge characteristics may be obtained by Equations 1 and 2 below.

High-rate discharge characteristics (%)=(Discharge capacity when being discharge with 5 C)/(Discharge capacity when being discharged with 0.2C)*100     Equation 1

High-rate discharge characteristics (%)=(Discharge capacity when being discharge with 10C)/(Discharge capacity when being discharged with 0.2 C)*100     Equation 2

The high-rate discharge characteristics of the lithium secondary batteries of Examples 3, 4 and Comparative Example 2, which are calculated by Equation 1, are 92.97%, 91.68% and 85.03%, respectively. Thus, the high-rate discharge characteristics of the lithium secondary batteries of Examples 3, 4 are improved, when compared to the high-rate discharge characteristics of the lithium secondary battery of Comparative Example 2.

The high-rate discharge characteristics of the lithium secondary batteries of Examples 3, 4 and Comparative Example 2, which are calculated by Equation 2, are 90.43%. 87.96% and 78.69%, respectively. Thus, the high-rate discharge characteristics of the lithium secondary battery of Example 2 are improved, when compared to the high-rate discharge characteristics of the lithium secondary battery of Comparative Example 2.

Accordingly, a negative electrode active material includes a lithium titanate, wherein a portion of lithium of the lithium titanate is substituted by at least one selected from the group consisting of Sr, Ba, a mixture thereof and an alloy thereof, and thus a lithium secondary battery including the negative electrode active material has improved high-rate discharge characteristics.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A negative active material for a secondary lithium battery comprising lithium titanate,
wherein a portion of the lithium in the lithium titanate is substituted by at least one selected from the group consisting of strontium (Sr), barium (Ba), a mixture thereof and an alloy thereof,
wherein the peak of the surface (111) of the lithium titanate is in a region with a Bragg angle 2θ of 18.7°±about 0.2°;
wherein the lithium titanate is represented by Formula 1: $Li_{4-x}M_xTi_5O_{12}$,
wherein 0<x<0.6 and M is at least one selected from the group consisting of Sr, Ba, a mixture thereof and an alloy thereof.

2. The negative active material of claim 1, wherein 0<x<0.5.

3. The negative active material of claim 1, wherein 0<x<0.12.

4. The negative active material of claim 1, wherein the lithium titanate has a stable structure with a spinel shape.

5. The negative active material of claim 1, wherein the lithium titanate has about 0.07° to about 0.09° of a half band width of a peak of a surface (111) in an X-ray diffraction pattern obtained by using an X-ray with CuK-alpha characteristics.

6. The negative active material of claim 1, wherein the lithium titanate has about 0.11° to about 0.13° of a half band width of a peak of a surface (311) in an X-ray diffraction pattern obtained by using an X-ray with CuK-alpha characteristics.

7. The negative active material of claim 1, wherein the peak of the surface (311) of the lithium titanate is in a region with a Bragg angle 2θ of 35.9°±about 0.2°.

8. The negative active material of claim 1, wherein the lithium titanate has about 0.35 to about 0.60 of an intensity ratio (I(311)/I(111)) of a peak of the surface (311) with respect to the surface (111) in an X-ray diffraction pattern obtained by using an X-ray with CuK-alpha characteristics.

9. The negative active material of claim 1, wherein the lithium titanate has about 0.40 to about 0.55 of an intensity ratio (I(311)/I(111)) of a peak of the surface (311) with respect to the surface (111) in an X-ray diffraction pattern obtained by using an X-ray with CuK-alpha characteristics.

10. A secondary lithium battery comprising:
a positive electrode,
a negative electrode,
a separator;
and an electrolyte,
wherein the negative electrode comprises the negative active material of claim 1.

* * * * *